United States Patent
Klenk et al.

(10) Patent No.: US 11,747,790 B2
(45) Date of Patent: *Sep. 5, 2023

(54) METHOD AND SYSTEM OF PROVIDING PROCESS PROTOCOLS FOR MACHINE DATA

(71) Applicant: Celonis SE, Munich (DE)

(72) Inventors: Martin Klenk, Munich (DE); Alexander Rinke, Munich (DE); Bastian Nominacher, Munich (DE)

(73) Assignee: CELONIS SE, Munich (DE)

( * ) Notice: Subject to any disclaimer, the term of this patent is extended or adjusted under 35 U.S.C. 154(b) by 358 days.

This patent is subject to a terminal disclaimer.

(21) Appl. No.: 17/110,894

(22) Filed: Dec. 3, 2020

(65) Prior Publication Data
US 2021/0103274 A1 Apr. 8, 2021

Related U.S. Application Data

(63) Continuation of application No. PCT/EP2018/064664, filed on Jun. 4, 2018.

(51) Int. Cl.
*G05B 19/418* (2006.01)
*G06K 7/14* (2006.01)

(52) U.S. Cl.
CPC ....... *G05B 19/4183* (2013.01); *G06K 7/1413* (2013.01); *G05B 2219/31395* (2013.01)

(58) Field of Classification Search
CPC ................. G05B 19/4183; G05B 2219/31395
(Continued)

(56) References Cited

U.S. PATENT DOCUMENTS 8,989,904 B2 * 3/2015 Dreslinski .............. B25J 9/1674
 700/250
9,928,152 B2 * 3/2018 Kumar ................ G06F 11/3476
(Continued)

FOREIGN PATENT DOCUMENTS

DE 102008014633 A1 10/2009
DE 10 2013 112 896 A1 5/2015
(Continued)

OTHER PUBLICATIONS

Notice of Reasons for Rejection issued by the Japanese Patent Office for Japanese Patent No. 2020-560833, dated Jan. 5, 2022 with machine-generated English translation.
(Continued)

*Primary Examiner* — Hien D Khuu
(74) *Attorney, Agent, or Firm* — MYERS WOLIN, LLC

(57) ABSTRACT

A method is provided for providing process protocols for processes carried out by a number of physical devices. A sensor assigned to a physical device detects measured values. Time stamps are assigned to the detected measured values, and the process protocol is generated from the measured values detected by the sensor, from an assignment of the detected measured values to the sensor and/or to the at least one device, and from the time stamp assigned to the measured values. The process protocol has a number of data sets, and each data set of the process protocol has a first attribute, where a unique identification of a process is stored and by which the process step is assigned to the process, a second attribute, where an identification of the process step is stored, and a third attribute, where a sequence of the process steps within a process is stored.

17 Claims, 3 Drawing Sheets

(58) Field of Classification Search
USPC .......................................................... 700/116
See application file for complete search history.

(56) References Cited

U.S. PATENT DOCUMENTS

| | | | | |
|---|---|---|---|---|
| 10,830,583 | B2* | 11/2020 | Roithmeier | G01B 21/042 |
| 2008/0307076 | A1* | 12/2008 | Ewing | G01D 21/00 |
| | | | | 709/220 |
| 2009/0024239 | A1* | 1/2009 | Yoshioka | G06Q 10/06 |
| | | | | 700/110 |
| 2013/0132000 | A1* | 5/2013 | Tamaki | G05B 23/0281 |
| | | | | 702/35 |
| 2013/0335219 | A1* | 12/2013 | Malkowski | G08B 13/2491 |
| | | | | 340/539.22 |
| 2014/0355524 | A1* | 12/2014 | Li | H04L 45/22 |
| | | | | 370/328 |
| 2016/0170406 | A1 | 6/2016 | Al-Hajjaj | |
| 2017/0068702 | A1* | 3/2017 | Rinke | G06F 16/22 |
| 2017/0068705 | A1* | 3/2017 | Rinke | G06F 16/2455 |
| 2017/0068914 | A1* | 3/2017 | Rinke | G06Q 10/0633 |
| 2017/0212937 | A1 | 7/2017 | Rinke et al. | |
| 2017/0235298 | A1* | 8/2017 | Nixon | G05B 23/0264 |
| | | | | 700/19 |

FOREIGN PATENT DOCUMENTS

| | | |
|---|---|---|
| DE | 102013112896 A1 | 5/2015 |
| EP | 3 139 274 A1 | 3/2017 |
| EP | 3139274 A1 | 3/2017 |
| JP | H01-181186 A | 7/1989 |
| JP | 2001-034323 A | 2/2001 |
| JP | 2005-221386 A | 8/2005 |
| JP | 2006-302096 A | 11/2006 |
| JP | 2009-025851 A | 2/2009 |
| JP | 2013-073279 A | 4/2013 |
| WO | 2009115448 A1 | 9/2009 |
| WO | 2011/145496 A1 | 11/2011 |
| WO | 2015074772 A1 | 5/2015 |

OTHER PUBLICATIONS

Communication 94(3) issued by the European Patent Office for European Application No. 18 730 688.1, dated Dec. 13, 2021 with a machine-generated English translation.

Notice of Reasons for Rejection issued by the Japanese Patent Office for Japanese Patent No. 2020-560809, dated Feb. 9, 2022, with English translation attached.

* cited by examiner ly stored along with the raw data in the storage means.

METHOD AND SYSTEM OF PROVIDING PROCESS PROTOCOLS FOR MACHINE DATA

CROSS REFERENCE TO RELATED APPLICATIONS

This application is a continuation of International Application No. PCT/EP2018/064664, filed on Jun. 4, 2018, the contents of which are incorporated by reference herein.

TECHNICAL FIELD

The invention relates to a method of providing process protocols for processes, which are carried out by a number of physical devices, wherein the process protocols are provided to a process mining system.

BACKGROUND

It is known to provide a barcode to products that allows for the product being localized in a production/processing line. For this, reading means may be provided at predetermined locations of the production/processing line, by means of which the barcode of the product can be read out. During reading out of the barcode, the respective reading means may signalize the location of the corresponding product. Thereby, however, it is only possible to answer the question which product is currently located at which point of the production or processing line. Even if these data, i.e., at what time which product has been located at which location in the production or processing line, are stored, thereby, only the question can be answered, which product has been located at what point of time. However, more detailed questions cannot be answered by this.

In particular, it is not possible to determine, which manufacturing or processing step has been taken for which product and at which station, because it certainly would be conceivable that a processing station processes the same or similar products differently.

Besides this information, it is desirable to analyze and visualize the entire process (e.g. processing process) of a product, for example, in order to recognize bottlenecks or errors in the process as soon as possible and to be able to take appropriate measures. This is of interest specifically if different parts of a final product are processed along several processing lines. In this case, it is possible that the individual parts of the final product are processed as desired along their respective processing line, but nevertheless, the final product may be assembled only with a delay. In order to detect such a delay of a final assembly, all processing processes of the individual parts have to be analyzable and visualizable on a cross-process basis, for example, in order to determine, which part or which parts have led to the delayed final assembly. The entire processing chain may be newly adjusted by means of this information, for example, the processing procedures of the individual parts may be coordinated with respect to each other.

For example, in order to be able to reliably detect a bottleneck in a process, in most cases, it is necessary to analyze a large number of process instances of the process, for example, in order to recognize outliers, which not necessarily have to lead to a new calibration of the process.

Moreover, means known from prior art do not enable monitoring the individual processing stations, for example, machines assigned to individual processing stations, within the context of a processing procedure of a product. Therefore, it may happen that, for example, the processing of a product is delayed due to a machine error, which for example, may lead to a delay of the higher level production process.

Thus, by means of the methods and means known from prior art, it is not possible to visualize and to analyze all process correlations, including sensor and machine data, in the production.

Therefore, the present invention has as an object to provide solutions, which enable a reliable monitoring of the processing of products along a production or processing line as well as of the means that process the products, in particular, an efficient analysis and evaluation of the entire production process of a product and the means involved therein.

SUMMARY

According to the invention, this object is addressed by the claims.

Accordingly, a method of providing process protocols for processes, which are carried out by a number of physical devices is provided, wherein at least one sensor is assigned to at least one physical device, the at least one sensor is adapted to detect physical properties of the device as measured values, and the at least one sensor detects the physical properties of the device as measured values, the measured values detected by the at least one sensor are assigned to the at least one sensor and/or to the at least one device, at least one time stamp is assigned to the measured values detected by the at least one sensor, which indicates, at what time the respective measured value has been detected by the sensor, the process protocol is generated from the measured values detected by the at least one sensor, from the assignment of the detected measured values to the at least one sensor and/or to the at least one device, and from the time stamp assigned to the measured values, wherein the process protocol comprises a number of data sets, wherein each data set describes a process step of the process, and wherein each data set of the process protocol comprises at least:

a first attribute, in which a unique identification of a process is stored and by means of which the process step is assigned to the process;

a second attribute, in which an identification of the process step is stored; and a third attribute, in which a sequence of the process steps within a process is stored and the process protocol that has been generated is stored in a storage means.

The physical devices are technical facilities, for example machines or technical monitoring means.

It is preferable, if the measured values detected by the at least one sensor are transmitted to the storage means via a communication network, the measured values transmitted to the storage means are stored as raw data in the storage means, wherein the raw data are assigned to the at least one sensor and/or to the at least one device, and in addition to the measured values comprise the at least one time stamp for each measured value, and the process protocol is generated from the raw data stored in the storage means and the respective assignment of the raw data to the at least one sensor and/or to the at least one device.

It is preferable, if the sensor generates
from the measured values detected by it,
from the assignment of the detected measured values to the at least one sensor and/or to the at least one device, and
from the time stamp assigned to the measured values at least one data set of the process protocol, and transmits the generated data set for being stored to the storage means.

The at least one sensor may detect the physical properties of the device as measured values spaced in time, preferably cyclically.

The at least one sensor may detect a number of measured values spaced in time, and transmits the number of measured values together with one time stamp per measured value to the storage means.

Subsequently to the detection, the detected measured values may be transmitted spaced in time to the storage means.

A number of physical devices may be respectively assigned to at least one sensor, wherein a sensor network is created by the sensors assigned to the physical devices, and wherein the sensors assigned to a physical device form a sensor node of the sensor network.

The measured values detected by the sensors assigned to the various physical devices and the measured values stored in the storage means as raw data may be assigned to a predetermined process as process steps during generation of the process protocol.

It is advantageous, if the sensor nodes of the sensor network are coupled to each other operatively, wherein the communication network is created by the coupling of the sensor nodes, via which the measured values detected by the sensors of the sensor nodes are transmitted to the storage means.

Some of the sensor nodes of the sensor network may receive measured values of at least one first sensor node, and may transmit the received measured values to a second sensor node.

The data representing the received measured values may be edited prior to being transmitted to the second sensor node, in particular, may be converted into a data format that is uniform for the entire sensor network.

Prior to being stored in the storage means, the data transmitted to the storage means may be edited, in particular, may be converted into a uniform data format.

During generating the process protocol, the identification of the process step may be generated from the measured values stored as raw data depending on the assignment of the respective measured value to the at least one sensor and/or to the at least one device.

During generating the at least one data set of the process protocol, the identification of the process step may be generated from the measured values detected by the sensor and the assignment of the detected measured values to the sensor and/or to the device.

It is advantageous, if for each sensor and/or for each device, the identifications of the process steps belonging to predetermined measured values or measured values intervals are stored in a configuration file or configuration table, wherein for generating the identification of the process step, the latter is determined by means of the configuration file or the configuration table.

The sequence of the process steps within a process may be determined by the time stamps assigned to the measured values, wherein the respective time stamp is stored in the third attribute.

It is advantageous, if context related data are assigned to the at least one data set of the process protocol, wherein the context related data are provided
by the at least one sensor, or
by the at least one device, or
are generated during the generation of the process protocol.

The process protocol generated and stored in the storage means may be provided to a process mining system for analysis of the processes.

Thus, embodiments of the present invention allows for data being transmitted from one or several sensors or reading means to machines and/or objects and being transformed in order to generate process protocols by means of which all process correlations, including sensor and machine data, may be visualized and analyzed during the production.

On the other hand, the current prior art only allows for a visualization of processes, which are entirely executed in IT systems/information systems. External, i.e., processes running outside of the IT systems/information systems or partial processes may not be visualized or even analyzed by this.

A further advantage of embodiments of the invention is that process protocols may be enriched by context-related data of machines and/or objects during the production, enabling substantially better analyses of the process flows.

BRIEF DESCRIPTION OF THE DRAWINGS

Details and features of the invention as well as concrete embodiments of the invention may be derived from the following description in combination with the drawing, in which.

DETAILED DESCRIPTION

Figure 1:
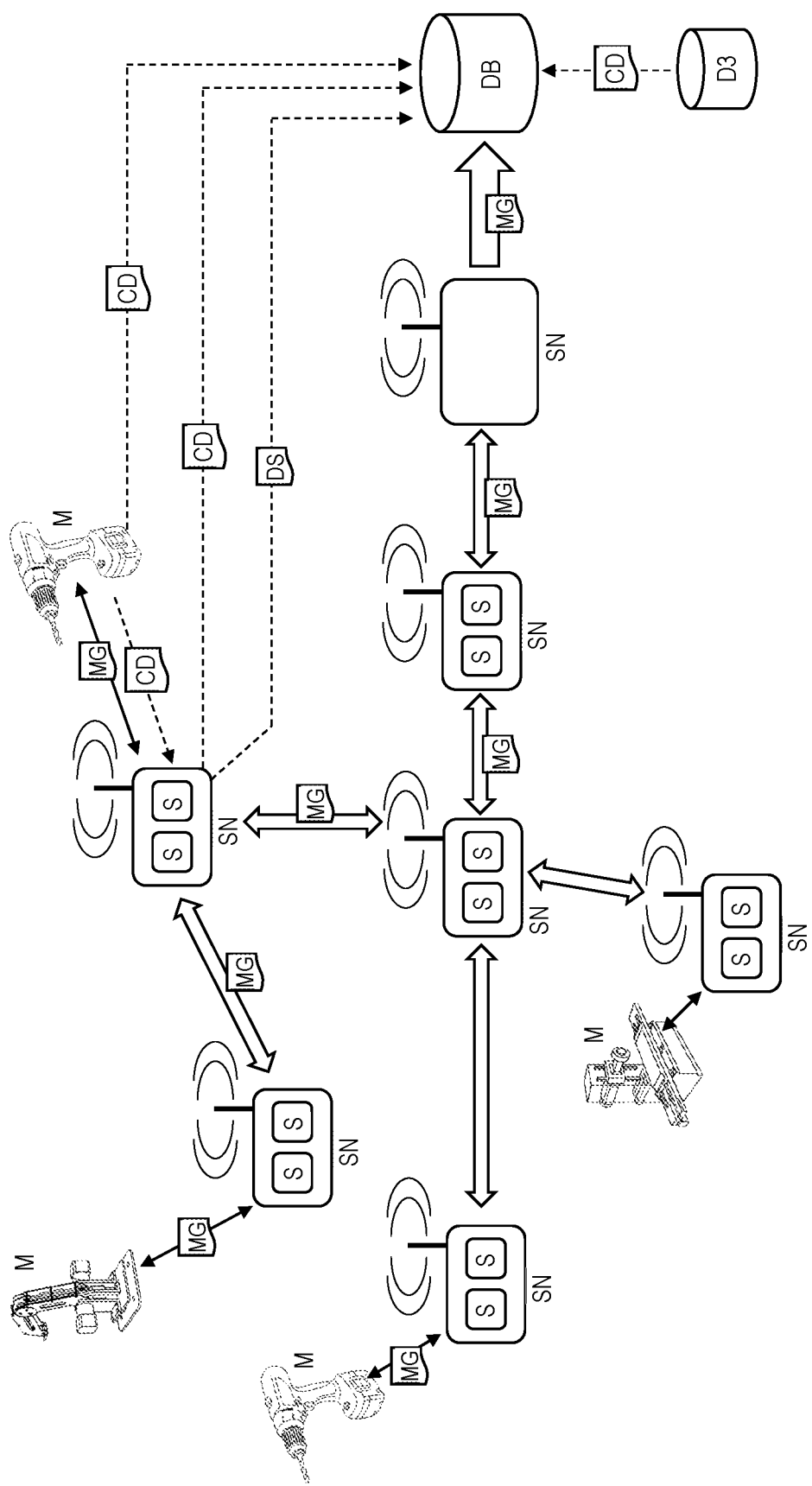
FIG. 1 shows a block diagram for illustrating a first aspect of the invention, according to which physical means, for example, machines may be monitored and corresponding process protocols may be generated.

FIG. 1 shows a block diagram for illustrating the method according to a first aspect of the invention.

Several physical facilities M for the manufacturing and the processing of products are provided at a production site. Physical facilities may be machines, for example, drilling machines, grinding or milling machines, assembly robots or similar machines. Besides processing machines, also non-processing machines may be provided, as testing means, which, for example, carry out function tests, or which test other properties of the products. In the following, these physical facilities M are referred to as machines M.

At least one sensor is respectively assigned to a number of machines M, preferably, to all machines M, by means of which physical properties of the machines M may be detected as measured values MG. For example, the torque or a torque progression may be detected for a drilling machine or for an electrical screwing means. In a further example, the power consumption may be detected for a machine in order to detect, for example, the switching on and off of the machine.

According to embodiments of the invention, it is possible to assign or to arrange appropriate sensors to/at each machine M in order to determine the respectively desired physical property as measured value.

Moreover, according to embodiments of the invention, it is also possible, to provide sensors S on the machines, by means of which rather than detecting physical properties of the machine, the physical properties of the product, which is manufactured or processed by the machine, are detected. For example, a sensor S may be provided on a painting robot M, by means of which the coating thickness of the coating layer that has been applied is measured after a coating procedure. A temperature sensor may be provided on a grinding or milling machine, by means of which the temperature profile of the work piece is detected during the grinding or milling process.

In the simplest case, a single sensor S is assigned to each machine M. As mentioned above, also several sensors S may be assigned to a machine.

A single sensor S assigned to a machine or several sensors S assigned to a machine M together may constitute a sensor node SN. Each sensor S or each sensor node SN may comprise a processing means, as a micro-processor, by means of which the detected measured values MG may be processed or edited. Moreover, each sensor S or each sensor node SN may comprise a storage means, in order to store or to temporarily store the detected and possibly edited or processed measured values MG.

The processing means of the sensors or sensor nodes may be adapted to generate a data set DS of the process protocol. The generation of a data set of a process protocol is described in the following in more detail. The data set DS generated by a sensor or sensor node may be transmitted to the storage means and may be directly inserted into the process protocol there.

In the following, the generation of the process protocol according to the first aspect of the invention shown in FIG. 1 is explained on the basis of the drilling machine M shown in FIG. 1.

Here, two sensors S are assigned to the drilling machine, wherein, for example, the first sensor detects the rotational speed of the drill, and a second sensor detects the torque of the drill as measured values MG. For this, the two sensors comprise appropriate measurement transducers, which are coupled to the drilling machine M or which are integrated into the drilling machine M in a suitable manner.

The measured values MG detected by the sensors S or by the sensor node SN are transmitted to a storage means DB, where the measured values are stored as raw data. Moreover, the measured values MG of all other sensors S or sensor nodes SN are stored as raw data in the storage means DB.

Then, the process protocol is generated from the raw data that have been stored in the storage means DB. Depending on from which sensors or sensor nodes the measured values MG have been stored in the storage means DB, also several different process protocols may be generated.

According to an embodiment of the invention, the process protocol or the process protocols are generated at a later point of time, i.e., after all measured values MG that are relevant for a process protocol have been stored in the storage means DB.

According to an alternative embodiment of the invention, the process protocol or the process protocols may also be generated continuously, i.e., after a measured value MG has been stored in the storage means DB as raw data, the corresponding process protocol is complemented. This continuous complementation of a process protocol has the advantage that deviations or errors during a process may already be recognized during the execution of the respective process, if for example, the process protocol is monitored continuously The process protocol that has been generated may in turn be stored in the storage means DB. Alternatively, the generated process protocol may also be stored in another storage means.

Independently of where the generated process protocol is stored, the latter is provided for further processing or evaluation to a process mining system. By means of such a process mining system, evaluations of already completed processes or of processes that still are being executed may be carried out in a cross-process manner.

Known process mining systems enable the reconstruction and visualization of IT-based processes (processes, which are entirely executed in an IT system) on the basis of digital traces left behind by these processes in the IT system. For reconstruction of the processes from these digital traces, the underlying raw data stored in a storage means are transformed into process protocols. The process mining system, hereby, enables a connection to this storage means or comprises this storage means itself. The process mining system reads out the process protocols and reproduces them in form of the process visualization. This visualization allows users to recognize and to analyze process sequences, in order to, for example, reveal vulnerabilities or errors.

Now, embodiments of the present invention enable to also visualize and to analyze processes, in which machines and objects (e.g. products) are involved, and which are executed entirely or partially outside of an IT system. For this, the already known process mining systems may be used in that the process protocols which are required for this are generated or created according to embodiments of the invention.

When storing the measured values MG transmitted to the storage means DB, a time stamp or a time interval consisting of two time stamps may be assigned to each measured value. The assignment of the time stamps during storage of the measured values MG in the storage means DB is advantageous in such a case, if the measured values detected by the respective sensor S or sensor node SN are transmitted to the storage means DB immediately after their acquisition. The transmission of corresponding time stamps from a sensor S or from a sensor node SN to the storage means DB may be avoided thereby, whereby the data volume to be transmitted may be reduced substantially, if needed, which is specifically important, if, for example, a large number of sensors or sensor nodes is present at the production site, which possibly transmit measured values MG to the storage means DB in very short time intervals.

According to an alternative embodiment, however, a sensor S or sensor node SN may detect several measured values spaced in time, and these measured values MG are transmitted to the storage means DB at a later point of time. In this case, it is advantageous, if the time stamp has been assigned to the respective measured value MG already by the sensor S or by the sensor node SN.

Independently of where the assignment of the time stamp of the respective measured value MG has been performed, the time stamp generally indicates when the corresponding measured value MG has been detected. According to the alternative embodiment, several measured values are transmitted together with the respective time stamps to the storage means DB.

Further, the raw data stored in the storage means DB are assigned to a sensor or a sensor node or to the machine so that the process protocol may be generated correctly, or the processes may be reconstructed from the process protocol correctly. According to an embodiment of the invention, this assignment may be made by the sensors or by the sensor node directly, wherein the measured values MG are transmitted to the storage means DB together with an identification of the sensor or sensor node together with an identification of the respective machine.

According to an alternative embodiment of the invention, this assignment may also be done by the storage means, wherein, of course, the storage means has to know from which entity which measured values MG are received. The raw data representing the measured values are then assigned in the storage means DB to the respective sensors or to the respective machine.

Then, the process protocol is generated from the storage means DB, and is provided to the process mining system.

The transmission of the measured values detected by the sensors and, if needed, the time stamps and the assignment of the measured values to the sensors or to the machines may be carried out in a different manner.

According to an embodiment, each sensor or each sensor node may transmit the data directly to the storage means.

According to an alternative embodiment of the invention, the sensors or sensor nodes assigned to the different machines may form a so-called sensor network, wherein the data of a sensor or a sensor node may be transmitted via several sensors or via several sensor nodes to the storage means DB. With respect to the example shown in FIG. 1, for example, the measured values detected by the sensor node assigned to the drilling machine are transmitted via three further sensor nodes to the storage means DB.

At least the inner sensor nodes of the sensor network, thereby, are configured so as to receive data of a sensor node and to forward the received data to a further sensor node. Prior to the forwarding of the received data, these may be, if needed, edited. For example, a sensor node may edit the received data with respect to their data structure such that the received data and the measured values MG detected by the sensor node may be forwarded to the next sensor node with a uniform data structure. Thereby, for example, it can be achieved that all measured values detected by the sensors or by the sensor nodes arrive at the storage means DB in a uniform data structure.

The communication between the individual sensor nodes within the sensor network or between the sensor nodes and the storage means DB may be carried out through either wired or wireless technology. A combination of wireless and wired communication is also possible.

Several data sets are generated from the raw data (measured values, assignment of the measured values to the sensors or to the machines and time stamps) stored in the storage means DB, which together form the process protocol. Each data set of the process protocol has at least three attributes, wherein in the first attribute, a unique identification of a process is stored, and by means of which a process step is assigned to a process uniquely, in a second attribute, an identification of the process step is stored, and in the third attribute, the sequence of the process steps within a process is stored. Each data set also represents a process step of a process while indicating the sequence of the process steps within this process.

The measured values MG belonging to a certain machine M may represent one or more processes. However, it is also possible that several machines are involved in a process such that the measured values belonging to these several machines represent one or more processes.

For example, the following raw data may be stored in a storage means DB for the drilling machine and the grinding machine:

| Machine | Sensor | Unit | Measured value | Time stamp |
|---|---|---|---|---|
| drilling machine | current | A | 0.0 | 08:15:35 |
| drilling machine | current | A | 1.3 | 08:16:15 |
| drilling machine | max torque | Nm | 0.4 | 08:17:22 |
| drilling machine | current | A | 0.0 | 08:17:55 |
| grinding machine | current | A | 0.0 | 08:23:00 |
| grinding machine | current | A | 1.8 | 08:24:00 |
| grinding machine | current | A | 0.0 | 08:25:00 |
| . . . | | | | |

In case the drilling machine and the grinding machine respectively are assigned to another process, because, for example, workpieces are processed by means of the drilling machine and the grinding machine, which are intended for different products, for example, the following process protocol may be generated from the raw data.

| Process ID (= first attribute) | Process step (= second attribute) | Time stamp (= third attribute) |
|---|---|---|
| 1 | drilling machine on | 08:16:15 |
| 1 | borehole completed | 08:17:22 |
| 1 | drilling machine off | 08:17:55 |
| 2 | grinding machine on | 08:24:00 |
| 2 | grinding machine off | 08:25:00 |
| . . . | | |

The process step respectively is assigned to another process by means of the first attribute (process ID).

In case the drilling machine and the grinding machine are assigned to a process, for example, because a certain workpiece has to be drilled at first and subsequently has to be ground, for example, the following process protocol may be generated from the raw data.

| Process ID (= first attribute) | Process step (= second attribute) | Time stamp (= third attribute) |
|---|---|---|
| 1 | Drilling machine on | 08:16:15 |
| 1 | borehole completed | 08:17:22 |
| 1 | Drilling machine off | 08:17:55 |
| 1 | grinding machine on | 08:24:00 |
| 1 | grinding machine off | 08:25:00 |
| . . . | | |

The process steps of the drilling machine and the grinding machine are assigned to the same process by means of the process ID (=1).

The process ID, for example, may be determined from an identification of the product to be produced such that, for example, all workpieces (or sub-products), which belong to a certain product, receive a common and unique identification of the process. The identification of the product, for example, may be determined by means of machine-readable data, which are arranged at the product/workpiece, and which, for example, may be read out by means of a reader (e.g., at the respective machine M) (as shown, for example, with respect to FIG. 2). These data may be transmitted to the storage means as context-related data CD.

The context-related data may be transmitted from the machine M directly to the storage means. The context-related data may be correlated to the raw data by means of the transmission time and the time stamps in the raw data. Alternatively, these context-related data CD may also be transmitted together with measured values, wherein here, the relation to each other is already given by the common transmission.

However, if only processes of individual machines are to be considered (e.g., evaluated) (e.g., if each processing procedure for a machine is considered as an individual process), then this identification of the process may be determined, for example, from the identification of the machine.

By means of specific events, several processes executed by a machine may be distinguished. Such an event may be present with respect to the example of the drilling machine mentioned above, if the current changes from 0.0 A to a value higher than 0.0 A. This change of the current may be interpreted as an event "drill on", which may be synonymous with the drilling machine processing a new/different workpiece, and thereby, and new process has been started.

Of course, also measured values detected for a machine may be considered as a single (continuous) process.

The context-related data may also comprise further data, as information on a person, who operates the respective machine, or information with respect to the order, the customer, etc.

According to an embodiment of the invention, the context-related data CD may also be provided by an external system or by a third system D3, and may be transmitted to the storage means DB, if needed, or may be referenced by the respective data set of the process protocol.

The value of the second attribute (process step) may be determined on the basis of the measured values MG. With respect to the example mentioned above, a modification of the measured value current from 0.0 A to a value larger than 0.0 A for the drill may be synonymous with "drill on". "Drill on" may then be stored as a value of the second attribute in the corresponding data set of the process protocol.

However, it is preferable, if the respective identifications of the process steps (=values of the second attribute) are stored with respect to certain measured values/measured-value interval sensor combinations in a configuration file or in a configuration table. Then, the identification may be determined from the configuration file or from the configuration table when generating the data sets of the process protocol.

Figure 2:
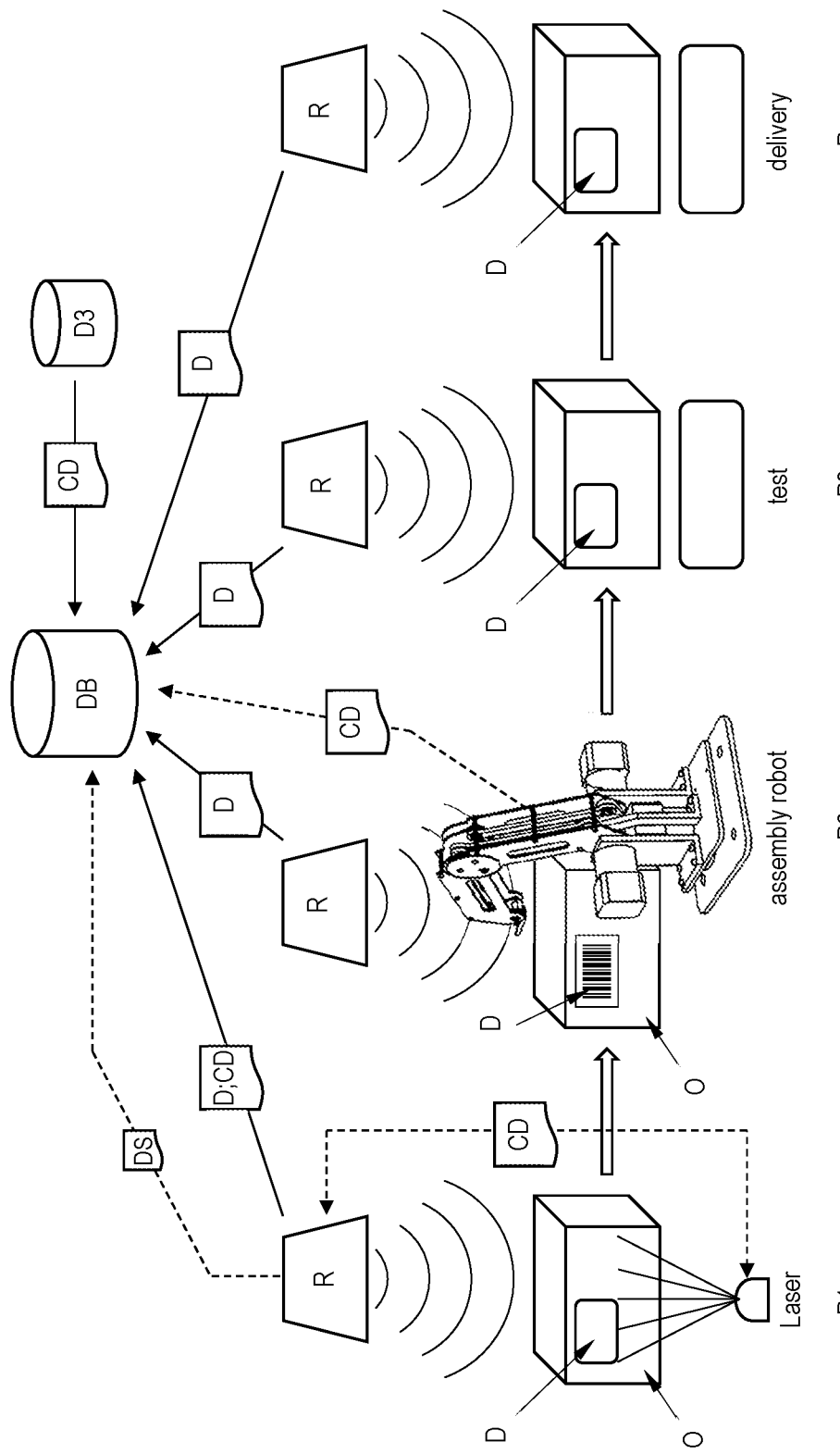
FIG. 2 shows a block diagram for illustrating a second aspect of the invention, according to which products or objects are monitored along a production or processing line, and corresponding process protocols are generated.

Then, based on the process protocol, it may be determined by means of a process mining system for the drilling machine, whether the time increases over the time period between "drill on" and "max torque" for the drill, or whether the maximum torque falls below a certain predetermined value FIG. 2 shows a block diagram illustrating the method according to a second aspect of the invention.

In the block diagram shown in FIG. 2, objects O (mostly workpieces or products) are processed or manufactured along a production/processing line. In the example shown in FIG. 2, the production/processing line comprises, for example, a laser (by means of which, for example, the size and position of the object O may be sensed), an assembly robot (e.g., for attaching components to the object O), a testing means (e.g., for performing function tests), and a dispatching station (e.g., for packaging the finished object O). However, also other, in particular, more than four stations, may be provided at the production/processing line. Also, other, in particular, more than our stations may be provided at the production/processing line.

Each station of the production/processing line is assigned to a reading means R, by means of which information with respect to the respective object O may be detected at the respective station P1 to Pn. For this, machine-readable data D are assigned to each object O, for example, in the form of a bar code/QR code or in form of a storage means that may be read out by means of electro-magnetic waves (e.g., an RFID tag). The reading means are adapted suitably so as to read out these data D (e.g., barcode reader or RFID reading means).

According to an alternative embodiment of the invention, reading means may only be provided at some of the stations.

The reading means may be adapted so as to generate a data set DS of the process protocol. The data set DS generated by the reading means may be transmitted to the storage means, and may be inserted there directly into the process protocol.

As soon as an object O has reached a station P1 to Pn and/or leaves the latter, the machine-readable data D are read out. The read out data then are transmitted from the reading means R to a storage means DB, where they are stored as raw data.

As in the example according to FIG. 1, also here, the data transmitted are provided with one or more time stamps. The assignment of the time stamps may be carried out by the reading means R or during storage of the transmitted data by the storage means DB.

If, according to this variant of the invention, the machine-readable data D are not transmitted immediately after having been read out to the storage means DB, it is advantageous, if the assignment of the time stamps is done by the reading means R. Thus, the reading means R may register, for example, the entering or the exiting of a station, however, the data may only be transmitted to the storage means only when the object O leaves. In this case, the reading means R may, however, register the point of time of arrival of the object O and transmit it together with the data D to the storage means DB.

For monitoring the production/processing line in real-time (or approximately in real-time), it is advantageous, if each reading means R transmits the detected data D immediately to the storage means DB. Thereby, for an object O, it is possible to already determine during a process (which is carried out along the production/processing line), whether this process still is within certain parameters (e.g. within predetermined runtimes).

From the data transmitted to the storage means DB or from the raw data stored in the storage means, the process protocol is generated. The process protocol comprises at least three attributes, which have already been described with respect to FIG. 1. From the product identification, which is part of the machine-readable data and which is read out by the reading means R, it is possible to generate the process identification during the generation of the process protocol and stored in the first attribute of the process protocol. By using the context-related data CD, an identification may be generated for the respective process step, and may be stored in the second attribute of the process protocol. The third attribute, in which the sequence of the process steps within a process is stored, results from the respective time stamps.

For the example shown in FIG. 2, for example, the following raw data may be stored in the storage means DB.

| Product ID | Product type | Production step | Status | Time stamp |
|---|---|---|---|---|
| 10815 | chassis | laser | OK | 08:15:35 |
| 10815 | chassis | assembly | OK | 08:16:15 |
| 10815 | chassis | function test | OK | 08:17:22 |
| 10815 | chassis | delivery | OK | 08:17:55 |
| 10816 | undercarriage | laser | OK | 08:23:00 |
| 10816 | undercarriage | assembly | OK | 08:24:00 |
| 10816 | undercarriage | function test | nOK | 08:25:00 |
| ... | | | | |

From these raw data, for example, the following process protocol may be generated.

| Process ID (= first attribute) | Process step (= second attribute) | Time stamp (= third attribute) |
|---|---|---|
| 1 | start production | 08:15:35 |
| 1 | assembly completed | 08:16:15 |
| 1 | test sucessful | 08:17:22 |
| 1 | product dispatched | 08:17:55 |
| 2 | start production | 08:23:00 |
| 2 | assembly completed | 08:24:00 |
| 2 | test not successful | 08:25:00 |
| ... | | |

The process steps are respectively assigned to a certain process by means of the first attribute (process ID).

The context-related data CD, from which the values are determined for the second attribute, for example, may be provided by the respective station P1 to Pn. For example, the station P3, which carries out a function test, may provide the status (OK or nOK) of the tests as context-data for the tested product.

These context-related data CD may be transmitted directly to the storage means from the respective station (preferably, together with a time stamp), and based on the time stamp, may be assigned to the respective production step. Alternatively, the context-related data CD may also be transmitted from the respective station to the reading means R assigned to the station, and may be transmitted from the reading means together with the data D that have been read out to the storage means.

With respect to the example shown in FIG. 2, the object O (if no disturbances or the like occur) passes through four stations such that the processing procedure has at least four process steps in the process protocol for the object.

This process may also comprise more process steps, if, for example, the arrival of the object at the station and its exiting from the station are generated in the process protocol as process steps. Thereby, it is possible to determine, for example, the retention time of an object at a station, for example, in order to be able to determine, at which station the process is delayed.

Figure 3:
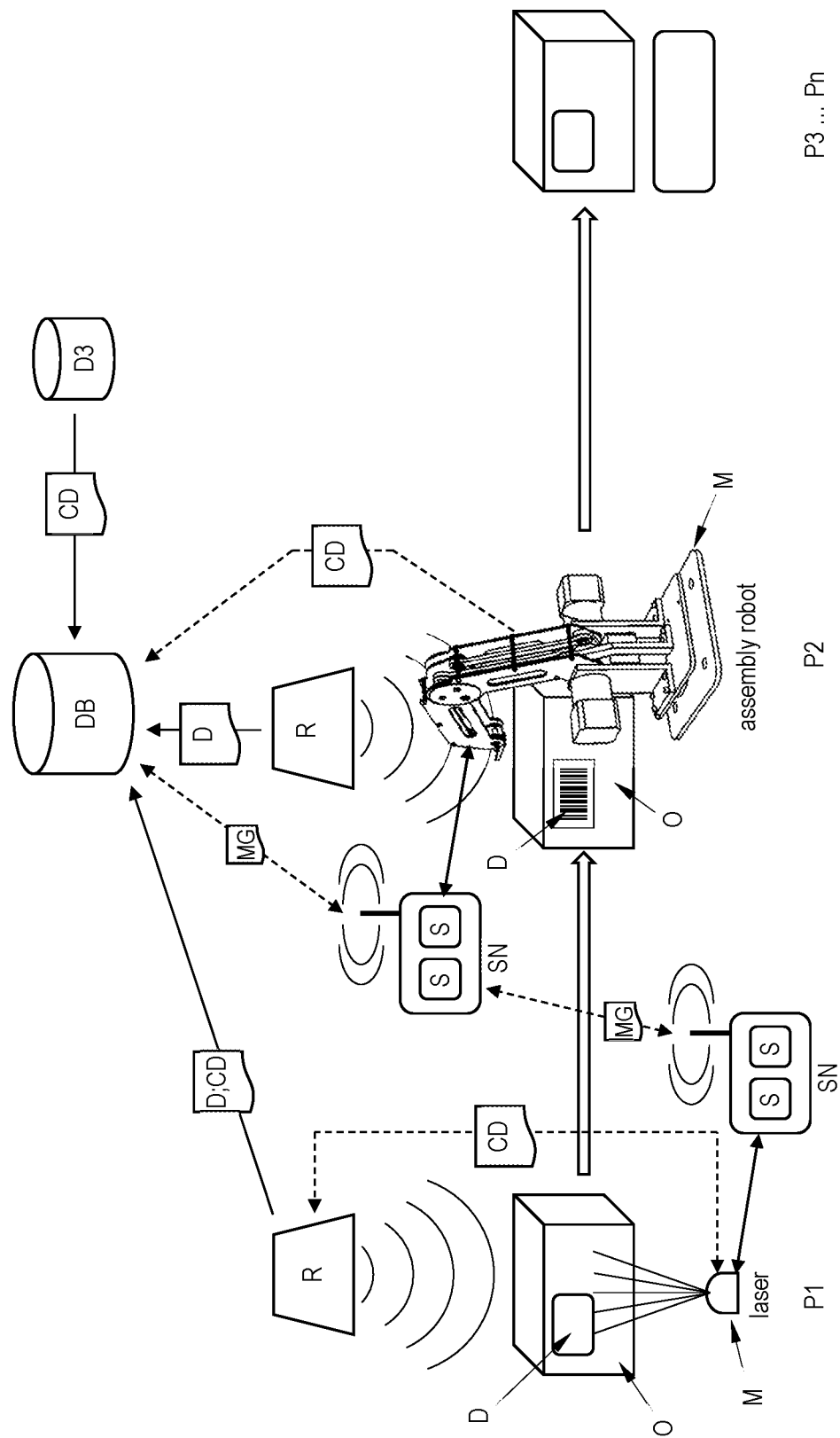
FIG. 3 shows a block diagram for illustrating a third aspect of the invention, according to which physical means as well as products or objects may be monitored along a production or processing line, and corresponding process protocols are generated.

FIG. 3 shows a block diagram for illustrating the method according to a third aspect of the invention.

With respect to the variant of the method shown in FIG. 3, the advantages of the variant described with respect to FIG. 1 and the advantages described with respect to FIG. 3 may be combined. When visualizing and analyzing the process sequences, the object and product related data, which are provided by the reading means R, machine related data, which are provided by the sensors S or by the sensor nodes SN, and context-related data may thus be taken into account. Thereby, even more detailed analyses are possible. In particular, correlations and dependencies may be recognized, which may not be recognized by means of the two variants shown in FIG. 1 and FIG. 2.

According to the variant according to FIG. 1, it may be determined, for example, that a certain machine frequently exceeds a certain machine parameter or does not reach it (e.g., a drilling machine frequently does not achieve the necessary torque after a predetermined drilling period).

According to the variant according to FIG. 2, it may be determined, for example, that certain products, in which boreholes have been made, do not pass the function test at a test station, because the boreholes do not meet certain criteria (e.g., the boreholes are not deep enough).

By means of the combination of the two variants according to FIG. 1 and FIG. 2, now, a correlation between the machine parameter and the erroneous boreholes may be deduced. For example, it is possible to recognize that the drilling machine has not reached the necessary torque exactly for those products, in which the boreholes are not deep enough. The processing or manufacturing process may now be calibrated accordingly, e.g., the drilling period may be extended, when boreholes are to be drilled in this product, until also these products reach the required borehole depths.

Thus, certain correlations may only be recognized by the combination of the two variants according to FIG. 1 and FIG. 2 such that, for example, an error search or a search for the causes and thereby, possibly, accompanying downtimes or production stops may be reduced substantially.

With respect to the variant shown in FIG. 3, machine-readable data D are assigned to the products or objects O, which are processed or manufactured along a production/processing line. The configuration of this machine-readable data D has been described with reference to FIG. 2.

Reading means are assigned to the stations P1 to Pn of the production/processing line, by means of which the machine-readable data D may be read out as soon as an object O arrives at the respective station and/or leaves the latter.

Sensors S or sensor nodes SN are assigned to the machines M, by means of which certain physical properties of the respective machine may be detected as measured values MG (as temperature, torque, etc.). The embodiment of the sensors S or the sensor nodes SN and the creation and functioning of a sensor network created by using the sensor nodes SN have been described with reference to FIG. 1.

The machine-readable data D detected by the reading means R and the measured data MG detected by the sensors S or sensor nodes SN are transmitted to the storage means DB and are stored there as raw data. Then, process protocols are generated from these raw data, which then are provided to a process mining system. The generation of the process protocols has been described with reference to FIG. 1 and FIG. 2.

Moreover, the reading means R as well as the sensors S or sensor nodes SN as well as the machines may themselves transmit context-related data CD to the storage means DB, as also has been described with reference to FIG. 1 and FIG. 2. By means of these context-related data CD, the assignment of the data D transmitted from the reading means R to the data MG transmitted from the sensors S or sensor nodes SN may be made.

Alternatively or additionally to this, the assignment may also result from the time stamps, which are transmitted together with the data D transmitted from the reading means R and the data MG transmitted from the sensors S or sensor nodes SN.

Based on this assignment, the process steps resulting from the data D transmitted by the reading means R as well as the process steps resulting from the data MG transmitted by the sensors S or sensor nodes SN may be assigned in the process protocol to the correct process. Hereby, the generation of the process steps is carried out as has been described with reference to FIG. 1 and FIG. 2.

In the following, examples for raw data, which have been stored in a storage means DB for data MG transmitted by a sensor node SN, and for raw data, which have been stored in the storage means DB for data D transmitted by a reading means R, as well as the process protocol resulting therefrom are shown.

| Machine | Sensor | Unit | Measured value | Time stamp |
|---|---|---|---|---|
| drilling machine | current | A | 0.0 | 08:15:35 |
| drilling machine | current | A | 1.3 | 08:16:15 |
| drilling machine | max torque | Nm | 0.4 | 08:17:22 |
| drilling machine | current | A | 0.0 | 08:17:55 |

Raw Data for the Data MG

| Product ID | Product type | Production step | Status | Time stamp |
|---|---|---|---|---|
| 10815 | chassis | laser | OK | 08:10:00 |
| 10815 | chassis | assembly | OK | 08:14:00 |
| 10815 | chassis | assembly | OK | 08:20:00 |
| 10815 | chassis | function test | OK | 08:25:22 |
| 10815 | chassis | delivery | OK | 08:50:00 |

Raw Data for the Data D

| Process ID (= first attribute) | Process step (= second attribute) | Time stamp (= third attribute) |
|---|---|---|
| 1 | start production | 08:10:00 |
| 1 | start assembly | 08:14:00 |
| 1 | drilling machine on | 08:16:15 |
| 1 | borehole completed | 08:17:22 |
| 1 | drilling machine off | 08:17:55 |
| 1 | assembly completed | 08:20:00 |
| 1 | test successful | 08:25:22 |
| 1 | product dispatched | 08:50:00 |

Process Protocol

Embodiments have been described above, according to which the data D, MG, CD have been transmitted to a storage means DB, and have been stored there as raw data. This storage means may be a permanent memory (e.g., a hard disk) or may be a volatile memory (e.g., internal memory).

For a processing of the transmitted data as a stream, it is advantageous to keep the latter in the internal memory, wherein the process protocol is also generated in the internal memory and may be provided to the process mining system. This is particularly suitable, if a real-time analysis of processes is desired, and the process protocol is not needed any more after the analysis.

On the other hand, for a later analysis of the process protocols, it is advantageous to store the transmitted data and the process protocols generated therefrom in a permanent memory.

For storing and for organizing the data, database management systems, In-Memory databases, or also a file system may be used.

What is claimed is:

1. A method of providing a process protocol for processes, wherein the processes are carried out by a number of physical devices, the method comprising:
assigning at least one sensor (S) to at least one physical device (M), wherein the at least one sensor (S) is adapted to detect physical properties of the at least one physical device (M) as measured values,
detecting the physical properties of the at least one physical device (M) as the measured values (MG) by the at least one sensor (S),
assigning the measured values (MG) detected by the at least one sensor (S) to the at least one sensor (S) and/or to the at least one physical device (M),
assigning at least one time stamp to the measured values (MG) detected by the at least one sensor (S), which time stamp indicates, at what time a respective measured value has been detected by the at least one sensor (S),
generating the process protocol from the measured values (MG) detected by the at least one sensor (S), from the assignment of the detected measured values to the at least one sensor (S) and/or to the at least one physical device (M), and from the time stamp assigned to the measured values, wherein the process protocol comprises a number of data sets (DS), wherein each data set of the number of data sets (DS) describes a process step of the processes, and wherein each data set of the process protocol comprises at least:
a first attribute, in which a unique identification of a process is stored, wherein the unique identification assigns each process step of a sequence of process steps to the process;
a second attribute, in which an identification of each process step is stored; and
a third attribute, in which the sequence of the process steps within the process is stored,
transmitting the measured values (MG) detected by the at least one sensor (S) to the storage means (DB) via a communication network,
storing the measured values (MG) transmitted to the storage means (DB) as raw data in the storage means, wherein the raw data
are assigned to the at least one sensor (S) and/or to the at least one physical device (M), and
in addition to the measured values, comprise the at least one time stamp for each measured value (MG),
generating the process protocol from the raw data stored in the storage means (DB) and a respective assignment of the raw data to the at least one sensor (S) and/or to the at least one physical device (M), and
storing the process protocol that has been generated in a storage means (DB),
processing the transmitted measured values (MG) as a stream in a main memory,
generating the process protocol in the main memory, and
after a measured value (MG) is stored in the storage means (DB) as raw data, extending the process protocol continuously.

2. The method of claim 1, wherein the at least one sensor (S) generates at least one data set of the process protocol:
from the measured values (MG) detected by the at least one sensor (S),
from the assignment of the detected measured values (MG) to the at least one sensor (S) and/or to the at least one physical device (M), and
from the time stamp assigned to the measured values, and transmits the generated data set for being stored to the storage means (DB).

3. The method of claim 2, wherein during generating the at least one data set of the process protocol, the identification of the process step is generated from the measured values detected by the sensor (S) and the assignment of the detected measured values to the at least one sensor (S) and/or to the at least one physical device (M).

4. The method of claim 1, wherein the at least one sensor (S) detects the physical properties of the at least one physical device (M) as measured values spaced in time, preferably, cyclically.

5. The method of claim 4, wherein subsequently to the detection, the detected measured values are transmitted spaced in time to the storage means (DB).

6. The method of claim 1, wherein the at least one sensor (S) detects a number of measured values spaced in time, and transmits the number of measured values spaced in time together with one time stamp per measured value spaced in time to the storage means (DB).

7. The method of claim 1, wherein a number of physical devices (M) of the at least one physical device (M) are respectively assigned to the at least one sensor (S), wherein a sensor network is created by the sensors (S) assigned to the number of physical devices (M), and wherein the sensors (S) assigned to a physical device (M) form a sensor node (SN) of the sensor network.

8. The method of claim 7, wherein the measured values detected by the sensors (S) assigned to the various physical devices (M) and the measured values stored in the storage means as raw data are assigned to a predetermined process as the process steps during generation of the process protocol.

9. The method of claim 7, wherein the sensor nodes (SN) of the sensor network are coupled to each other operatively, wherein the communication network is created by the coupling of the sensor nodes (SN), via which the measured values detected by the sensors of the sensor nodes (SN) are transmitted to the storage means (DB).

10. The method of claim 9, wherein some of the sensor nodes (S) of the sensor network receive measured values of at least one first sensor node, and transmit the received measured values to a second sensor node.

11. Method according to claim 10, wherein data representing the received measured values are edited prior to being transmitted to the second sensor node, in particular, are converted into a data format that is uniform for the entire sensor network.

12. The method of claim 1, wherein prior to being stored in the storage means (DB), the data transmitted to the storage means (DB) are edited, in particular, are converted into a uniform data format.

13. The method of claim 1, wherein during generating the process protocol, the identification of the process step is generated from the measured values stored as the raw data depending on the assignment of the respective measured value to the at least one sensor (S) and/or to the at least one physical device (M).

14. The method of claim 13, wherein for each sensor (S) and/or each device (M), the identifications of the process steps belonging to predetermined measured values or measured values intervals are stored in a configuration file or configuration table, wherein for generating the identification of the process step, the identification of the process step is determined based on the configuration file or the configuration table.

15. The method of claim 1, wherein the sequence of the process steps within the process is determined by the time stamps assigned to the measured values, wherein the respective time stamp is stored in the third attribute.

16. The method of claim 1, wherein context related data (CD) are assigned to the at least one data set of the process protocol, wherein the context related data (CD) are provided
    by the at least one sensor (S), or
    by the at least one physical device (M), or
are generated during the generation of the process protocol.

17. The method of claim 1, wherein the process protocol generated and stored in the storage means (DB) is provided to a process mining system for analysis of the processes.

* * * * *